United States Patent Office 3,184,391
Patented May 18, 1965

3,184,391
BOILING WATER NUCLEAR REACTOR
Stanley Hackney, Fearnhead, near Warrington, England, assignor to United Kingdom Atomic Energy Authority, London, England
Filed May 31, 1961, Ser. No. 113,734
Claims priority, application Great Britain, June 9, 1960, 20,403/60
8 Claims. (Cl. 176—54)

The present invention relates to nuclear reactors of the kind known as "boiling water reactors." A reactor of this kind has a heat-producing core including fuel elements and steam is raised directly from the coolant by transfer of the heat thereto.

There must be safeguards against the possibility, however remote, of a breach occurring in the coolant circuit of the reactor because an escape of coolant and loss of pressure leads to overheating of the fuel elements and severe contamination of the coolant with fission products, notably radioactive idodine. If the coolant were to be released to the surroundings a serious hazard in the district would result, so that it has been necessary to enclose in an outer containment vessel at least as much of the reactor installation as carries the coolant. Containment vessels therefore tend to be very large, and hence expensive, structures and considerable economy, both in the initial cost of the reactor installation and the space occupied by it, could result if the necessity for a containment vessel could be avoided.

According to the present invention, in a recator for evaporating a water coolant and a having a heat-producing core including fuel elements, a liquid neutron-moderating heat transfer medium is present as an intermediary between the elements and the coolant at a pressure to prevent boiling and is contained separately from, but in heat transfer relationship with, the coolant in a circuit surrounded throughout by the coolant. The volumetric capacity of the circuit for the fluid heat transfer medium is less than the volume of coolant during normal operation of the reactor. With sheathed fuel elements, any extraneous activity arising due to a breached fuel element sheath occurs in the heat transfer medium and so long as this circuit remains intact the coolant cannot become contaminated and a breach of the coolant circuit cause a district hazard. Thus, a containment vessel may be dispensed with. Should the circuit carrying the heat transfer medium fail, it can be assumed that activity will escape into the coolant but this will be a condition causing reactor shut-down and eventual depressurisation so that no coincident breach can occur in the coolant circuit.

Preferably a pump means is provided to induce a forced circulation in the fluid heat transfer medium primarily for the purpose of aiding convective transfer of heat through the medium. This medium may be water of the same quality as that used for the coolant, giving the advantage that the heat transfer medium circuit can be replenished as necessary from the same supplies as the surrounding coolant.

The invention will be further described with reference to the embodiment, taken by way of example only, which is illustrated in the accompanying diagrammatic drawings.

Figure 1:
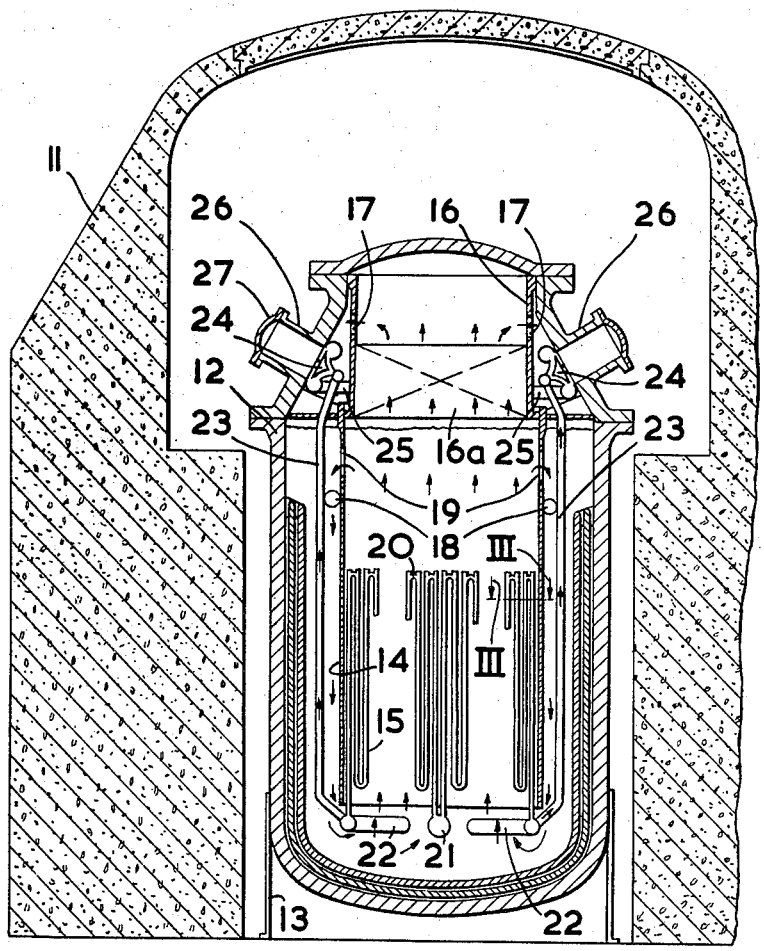
FIG. 1 is a section taken vertically through a relevant portion of a boiling water reactor installation.

Within a biological shield 11 of concrete, a pressure vessel 12 is supported on a supporting framework 13. A cylindrical shell 14 dependent within the vessel 12 bounds a core compartment in which is disposed a core consisting of a bank of tubes 15 clustered in upright parallel relationship and containing sheathed fuel elements with clearance (FIG. 3) as will be described in greater detail subsequently.

The upper end of the cylindrical shell 14 opens into a separator compartment bounded by a shorter cylindrical shell 16 disposed in the head of the pressure vessel. In the lower part of this shell there is structure, indicated generally 16a, constituting a steam separator. Steam collecting in the separator compartment approaches closely the dry saturated condition and is free to pass through openings 17 in the shell 16 to an outlet (not shown) in the pressure vessel. Such steam as is supplied from this outlet may be utilised directly as the working fluid for a prime mover, such as a steam turbine, or alternatively it may be passed to a heat exchanger to heat a separate working fluid. Direct utilisation of this steam as the prime mover working fluid is to be preferred, because of the saving of the secondary generator circuit represented by the heat exchanger and auxiliary equipment, and is made possible by the invention since, as will appear in greater detail subsequently, the steam does not pass in contact with the sheathed fuel elements and therefore does not carry fission products. At all events, the steam is retained in a closed circuit and the condensate is returned as feed water admitted to the pressure vessel through feed water inlets 18. These inlets open into the vessel externally of the cylindrical shell 14 and at points situated slightly below a ring of ports 19 adjacent the upper end of the shell 14. so that incoming feed water, distributed around the entire internal periphery of the pressure vessel on entry from the inlets, becomes mixed with a proportion of recirculating water at saturation temperature which has just left the core. The mixture reaches the core by flowing downwards in the annular space around the cylindrical shell 14, which space serves as a downcomer. After entering at the bottom of the core, the water is first heated to saturation temperature and, as it progresses further upwards through the core, becomes evaporated.

The tubes 15 of the core bank are upright and are interconnected by top and bottom reverse U bends, such as 20, to establish radial flow paths of serpentine configuration with long straight runs from a central inlet header 21 to a pair of outer outlet headers 22 each extending in the shape of a semi-circle adjacent the perimeter of the tube cluster at the lower edge of the cylindrical shell 14.

These flow paths through the tubes form part of an inner closed circuit which is completed by pipes 23 rising respectively from the outer headers 22 to the inlets of respective circulating pumps 24 and by pipes 25 leading, in a manner not appearing in the drawings, from the pump outlets back to the central header 21. The motors of these circulating pumps are accommodated in pockets 25 formed in the head of the pressure vessel which pockets are closed off by end caps, such as 27. It is to be understood that the circulating pumps are of a known type, often referred to as a "canned rotor pump," in which the pumped fluid is sealed from the exterior of the pump casing by a sleeve or can interposed between the rotor and stator of an electrically driven kind of pump motor, the sleeve being closed at the end remote from the pump impeller. The reactor coolant, that is to say the water and steam, is permitted access around the pump casings; it is to be noted, therefore, that the inner circuit just described is surrounded throughout by the reactor coolant. References herein to this particular circuit are to be understood to mean the main circuit as distinct from any added parallel flow circuits as may be provided, for example, for bleeding of the circuit fluid through a scrubber and filter assembly for removing fission products. Such added flow circuits need not be surrounded by the reactor coolant without detracting from the safeness of the reactor since there are adequate shut-off facilities and, being as a rule at atmospheric pressure, the liability of accident is less than with pressurised working.

Figure 3:
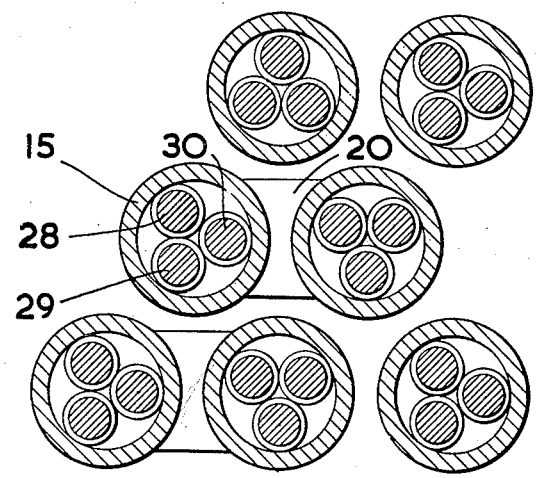
FIG. 3 is a section taken horizontally, as at line III—III of FIG. 1, through a group of tubes in the bank.

Each tube 15 contains a group of juxtaposed elongated sheathed fuel elements of circular cross section, there being three in the illustrated example denoted 28, 29, and 30 (FIG. 3). Wound around the sheath of each element is a helical spacing wire 31 across which the diameter is such that the three elements fit snugly in a triangularly arranged bundle in the tube, one being inserted with the wire helix oppositely handed to the other two. Preferably the elements are composed of several sections lengthwise of the tube and measures may be adopted to set adjacent bundles of sections in different angular relationship for the purpose of promoting turbulence in fluid circulated through the tubes and so enhance the heat transfer capabilities of such fluid.

Figure 2:
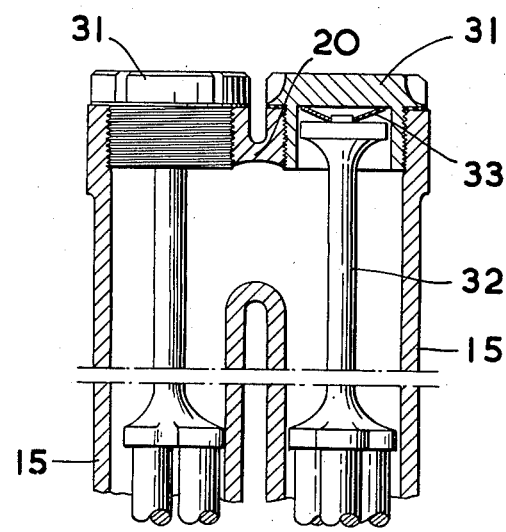
FIG. 2 shows in section a detail of a bank of tubes accommodating the sheathed fuel elements.

The upper U bends 20 of the tubes 15 are constructed with openings in alignment with the tubes so as to permit introduction and withdrawal of the fuel elements (FIG. 2). Such openings are closed by plugs 31; the plug appearing in section reveals that a stem 32 extending between the elements and the plug is seated resiliently in a recess in the latter through a Belleville washer 35. This resilient seating accommodates variation of the length of the elements in service. Whilst the material of the tubes 15 should have a low neutron absorption besides favoring maximum heat transfer the inclusion of the stems 32 places the plugs 31 outside the nuclear reaction region where this property is essential so that the plugs may be of a material less costly than the zirconium which is preferred for the tubes.

The core may be removed complete with the cylindrical shell 14 from the pressure vessel by first detaching the head of the vessel and breaking the lower sealing flange. In this way, the fuel can be kept contained during all stages of removal. Alternatively, by detaching the head of the pressure vessel, access can be gained for refuelling the individual tubes of the core through the plugs.

The inner circuit through the core tubes is charged with pressurised water, preferably of the same quality as the water acting as the reactor coolant, and this pressurised water is therefore present as a heat transfer medium between the sheathed fuel elements and the reactor coolant, the transfer of heat therethrough being enhanced by the forced circulation induced by the pumps in the circuit. The volume of the pressurised water is small compared with that of the water coolant, as is also the internal energy. It follows, therefore, that the circulating pumps 24 are of small size.

In the tubes 15, the heat transfer water is pressurised as necessary to prevent boiling so that its effect of moderating the neutron flux may remain constant in operation. The moderating effect of the pressurised water allows a high steam to water ratio in the coolant rising through the core; on leaving the core the proportion of steam may be as much as 80 to 90%.

For controlling the reactor a poison injection and purification system is employed (not appearing in the drawings) which can be used to introduce into the pressurised water a substance, such as boron, which has a higher neutron absorption. The purifying function of the system enables the additive level in the pressurised water to be reduced, for example to adjust for the diminishing activity of the fuel in service. A measure of control can also be obtained by varying the rate of circulation of the pressurised water.

Other liquid neutron-moderating heat transfer mediums may be used in place of the pressurised water. Examples are certain organic compounds, and heavy water. The first of these alternatives may permit a lower degree of pressurisation in the heat transfer medium and in this case the cross section of the core tube 15 could be less than for a water heat transfer medium.

The high steam to water ratio previously mentioned loads to a high power density in the reactor and as a result the core is smaller than in hitherto known boiling water reactors. A general reduction of size is therefore possible which together with the elimination of a containment vessel and secondary generator circuit represents a saving of initial construction costs.

If it is desired to superheat the steam in the reactor, the bank of tubes 15 may be grouped into an inner zone and a surrounding outer zone, the latter being used for evaporation and the resulting separated steam being directed downwards for superheating through the hotter inner zone.

I claim:

1. A nuclear reactor wherein a water coolant medium is evaporated by heat produced by a core of fuel elements, said reactor comprising a vessel enclosing a space wholly pervaded by said water coolant, a plurality of tubes which are spaced apart and each of which is disposed wholly within said space so as to be everywhere exposed externally to said water coolant wholly pervading said space, each of said tubes containing at least one of said fuel elements of said core and a liquid neutron-moderating heat transfer medium at a pressure to prevent boiling thereof.

2. A nuclear reactor as claimed in claim 1 further comprising pump means to circulate said heat transfer medium under pressure through said tubes.

3. A nuclear reactor according to claim 2 wherein the heat transfer medium is water of the same quality as is used for the coolant.

4. A nuclear reactor wherein a water coolant is evaporated by heat produced by a core of fuel elements, said reactor comprising a vessel containing said core and enclosing a space wholly pervaded by said coolant, and disposed wholly within said space, the combination comprising interconnected tubes clustered in parallel relationship and accommodating said fuel elements together with a liquid neutron-moderating heat transfer medium, conduit means completing with said tubes a closed circuit for said heat transfer medium, and pump means in said circuit for circulating and pressurising said heat transfer medium.

5. A nuclear reactor as claimed in claim 4 wherein said vessel includes a detachable head, and said tubes, conduit means and pump means constitute a unitary structure removable as a unit from said vessel.

6. A nuclear reactor wherein a water coolant is evaporated by heat produced by a core of fuel elements, said reactor comprising a vessel enclosing a plurality of tubes, each of said tubes enclosing at least one fuel element therein, pump means to circulate a liquid neutron-moderating heat transfer means under pressure through said tubes, first interconnections between each of said tubes, second interconnections between said tubes and said pump means, said first and second interconnections forming with said tubes and said pump means a closed circuit for the circulation of said liquid neutron-moderating heat transfer medium therethrough, and a space wholly pervaded by water coolant during reactor operation, said tubes, first interconnections, second interconnections and pump means being wholly within said space so as to be everywhere externally exposed to said water coolant pervading said space.

7. A nuclear reactor as claimed in claim 6 wherein said liquid heat transfer medium includes a substance of high neutron absorption.

8. In a nuclear reactor for evaporating a water coolant, the combination comprising open-topped tubes clustered in upright parallel relationship for receiving and grouping into a reactive core configuration a number of elongated sheathed fuel elements, such elements being received with clearance in said tubes for the inclusion additionally of a liquid neutron-moderating heat transfer medium, detachable closures for sealing the open tops of said tubes, inlet and outlet headers, means interconnecting said tubes with one another and with said headers to establish flow paths of serpentine configuration extending in a direction radially of the cluster between said inlet and outlet headers, conduit means extending between said inlet and outlet headers, and pump means associated with said conduit means for circulating in the direction from said outlet header to said inlet header and for pressurising said heat transfer medium.

References Cited by the Examiner

UNITED STATES PATENTS

| 2,890,158 | 6/59 | Ohlinger et al. | 204—193.2 |
| 2,958,637 | 11/60 | Voorhees | 204—154.2 |

FOREIGN PATENTS

| 214,410 | 6/58 | Australia. |
| 1,021,515 | 12/57 | Germany. |
| 799,725 | 8/58 | Great Britain. |

CARL D. QUARFORTH, *Primary Examiner.*

REUBEN EPSTEIN, LEON D. ROSDOL, *Examiners.*